(12) United States Patent
Xu et al.

(10) Patent No.: US 6,874,386 B2
(45) Date of Patent: Apr. 5, 2005

(54) STEERING WHEEL ARMATURE WITH DETACHABLE RIM

(75) Inventors: Xiaoping Xu, Rochester Hills, MI (US); Shiro Ohara, Royal Oak, MI (US); Jiro Harada, Naka-ku (JP)

(73) Assignee: Key Safety Systems, Inc., Sterling Heights, MI (US)

( * ) Notice: Subject to any disclaimer, the term of this patent is extended or adjusted under 35 U.S.C. 154(b) by 151 days.

(21) Appl. No.: 10/382,537

(22) Filed: Mar. 7, 2003

(65) Prior Publication Data

US 2004/0173047 A1 Sep. 9, 2004

(51) Int. Cl.[7] .............................. B62D 1/04; G05G 1/12
(52) U.S. Cl. ....................................................... 74/552
(58) Field of Search ....................... 74/552; 280/728.2, 280/731

(56) References Cited

U.S. PATENT DOCUMENTS

| | | | | |
|---|---|---|---|---|
| 3,893,349 A | * | 7/1975 | Stent ............................. 74/552 |
| 3,992,041 A | * | 11/1976 | Vernocchi ..................... 280/750 |
| 4,390,193 A | * | 6/1983 | Strahan et al. ............... 280/777 |
| 4,712,446 A | | 12/1987 | Kamata et al. ................ 74/492 |
| 4,887,484 A | | 12/1989 | Peng ............................. 74/556 |
| 5,584,501 A | * | 12/1996 | Walters ..................... 280/728.2 |
| 2002/0100342 A1 | | 8/2002 | Drefahl et al. ................. 74/552 |

FOREIGN PATENT DOCUMENTS

WO    WO 02/08045    1/2002

* cited by examiner

Primary Examiner—Chong H. Kim
(74) Attorney, Agent, or Firm—Jarett Rieger; Lonnie Drayer

(57) ABSTRACT

A steering wheel armature having a spoke joint allowing for the removal of the steering wheel rim from the hub plate. The steering wheel rim has a first plate that is aligned with a second plate from the hub plate whereby a fastening means secures the first plate with the second plate. A top cover and a bottom cover are utilized to conceal the spoke joint from the vehicle occupant.

16 Claims, 7 Drawing Sheets

STEERING WHEEL ARMATURE WITH DETACHABLE RIM

FIELD OF THE INVENTION

The present invention relates to a steering wheel for a motor vehicle and more particularly relates to a steering wheel having a detachable rim.

BACKGROUND OF THE INVENTION

Automotive steering wheels serve the crucial function of providing the driver of an automobile with the ability to steer the automobile. The steering wheel is attached to a steering shaft, which is responsible for turning the front wheels of the vehicle. In general, a steering wheel is composed of three main physical parts including, the hub plate, the spokes, and the rim.

In addition to providing a steering means, the steering wheel has an important role in the interior design of a vehicle. Currently, there are countless variations of steering wheel color and design. Steering wheel manufacturers may select virtually any color for the foam layer, which surrounds the steering wheel armature. Alternatively, the foam layer may have an additional layer such as wood veneer, leather wrap, or a combination thereof. Steering wheel manufactures may vary the style of a steering wheel by modifying the size and shape of the hub plate or by modifying the number of spokes.

Another major purpose of a steering wheel is to provide a storage location for a driver side airbag module. Driver airbag modules contain airbags and during an automobile crash, the airbag is inflated to minimize the injury sustained by the driver. United States federal law requires driver side airbags in all vehicles, however they add a significant amount of cost to a steering wheel as well as complicate the installment of electronic switches (i.e. horn switch) on steering wheels.

As a result of the large cost associated with a steering wheel containing an airbag module, it is cost prohibitive to allow automobile consumers the option of choosing a design and color for the steering wheel after the vehicle has been assembled. Thus, there is a desire to develop a steering wheel where it is affordable to change the rim of the steering wheel of a fully assembly vehicle to satisfy the aesthetic wishes of the automobile consumer without replacing an entire steering wheel. U.S. Pat. No. 4,887,484 teaches a steering wheel assembly including a detachable rim part and a central hub which are connected through linking mechanisms; the primary object of this prior art document is to provide a rim that can easily be removed for security purposes.

SUMMARY OF THE INVENTION

The steering wheel assembly according to the present invention has a spoke joint connecting the steering wheel rim to the hub plate. The spoke joint comprises a first plate and a second plate, whereby the first plate is attached to the steering wheel rim, and the second plate is attached to the hub plate. A top cover and a bottom cover are adapted to fit around the spoke joint to conceal the spoke joint from the vehicle occupant.

An aspect of the present invention is to use a bolt and a nut as the fastening means for the first plate to the second plate. A further aspect of the present invention is to incorporate a nut into the top cover and to provide an aperture in the bottom cover for the passage of a bolt. This embodiment allows for the attachment of the top cover, the bottom cover, the first plate, and the second plate by a bolt and a nut.

The benefit of the present invention is the ability of the steering wheel rim to be separated from the hub plate after vehicle assembly. Accordingly, the rim may be changed at the time of vehicle purchase or any other time during the life of the vehicle.

DETAILED DESCRIPTION OF THE INVENTION

Figure 1:
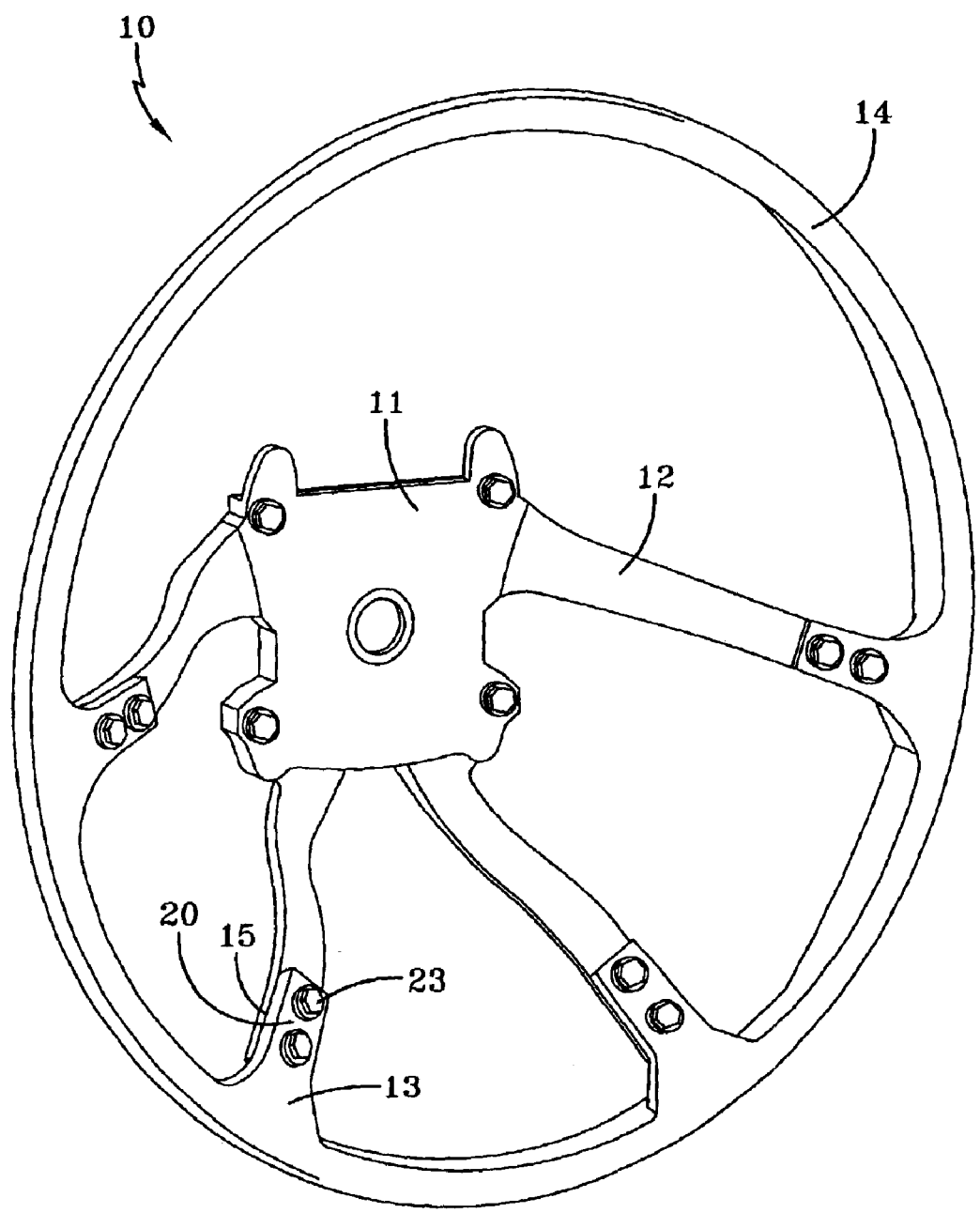
FIG. 1 represents an exemplary 4 spoke steering wheel armature.
Figure 2:
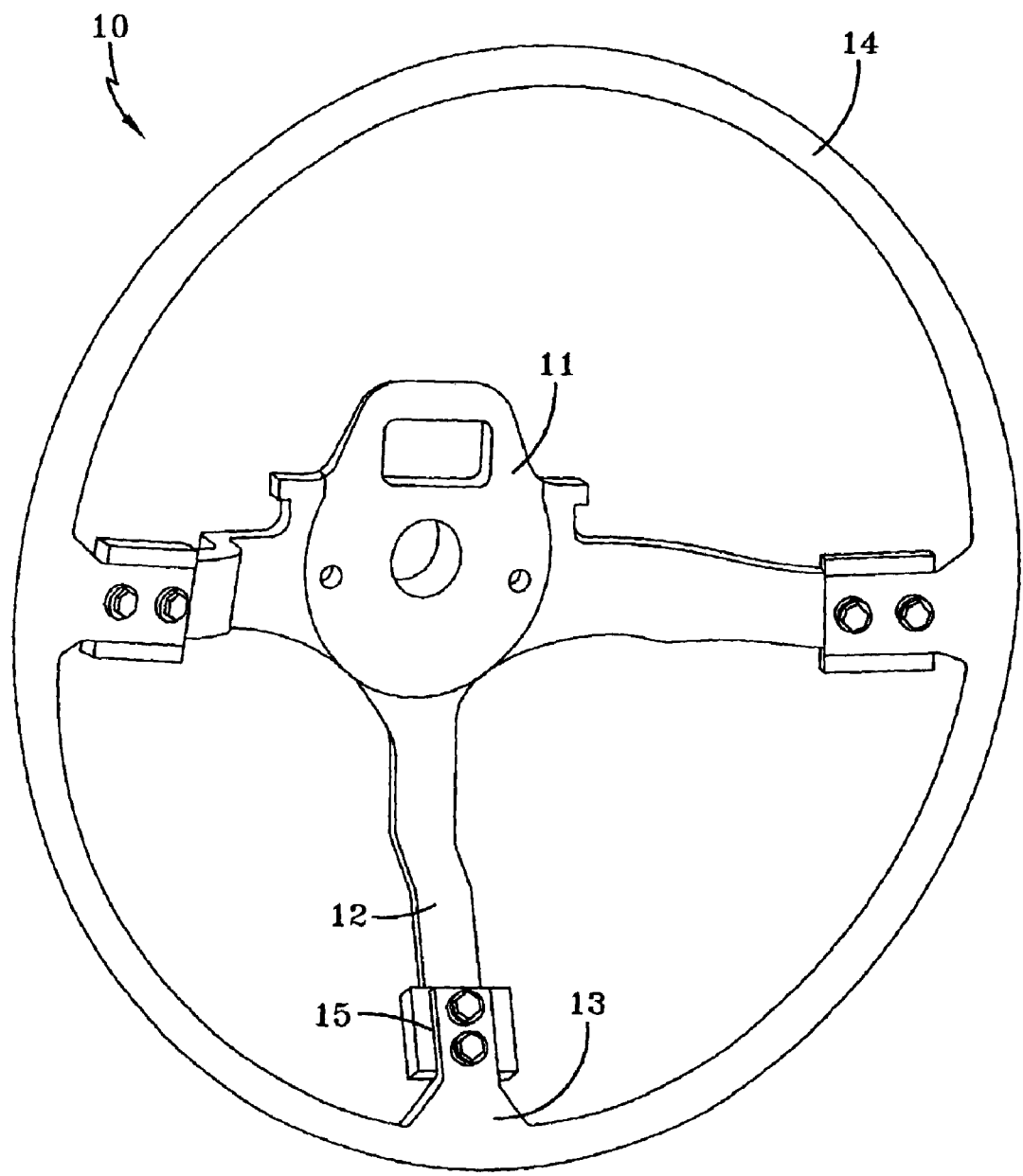
FIG. 2 represents an exemplary 3 spoke steering wheel armature.

A representative four-spoke steering wheel armature 10 is shown in FIG. 1, and a representative three-spoke steering wheel armature 10 is shown in FIG. 2. The hub plate 11 is the central portion of the steering wheel armature, which is fixedly attached to a steering shaft (not shown). The hub plate 11 has four inner spokes 12 extending therefrom in the direction of the rim 14. The inner spokes 12 are connected to the outer spokes 13 via the spoke joint 15, which will be discussed later. The outer spokes 13 extend inward from the steering wheel rim 14. The rim 14 has essentially a circular shape.

The steering wheel armature 10 is completely surrounded by a foam layer, and the steering wheel armature 10 and the foam layer are collectively referred to as the steering wheel assembly. A portion of the over molded hub plate 36 can be seen in FIG. 4 and a portion of the over molded rim 37 can be seen in FIG. 5. The foam layer may be made from a thermoplastic or thermoset material and provides the steering wheel assembly with a comfortable feel, while the steering wheel armature 10 provides the structural integrity of the steering wheel assembly. For many steering wheel assemblies, the foam is the outer layer of the steering wheel, however, in some more expensive steering wheel assemblies, a leather wrap (not shown), wood veneer (not shown), or some combination thereof will constitute the outermost layer of the steering wheel assembly.

The steering wheel armature 10 may be made from a non-ferric metal such as aluminum, magnesium, low carbon steel, an alloy, or plastic material. Since the armature 10 is made from assembling the steering wheel rim 14 to the hub plate, the steering wheel rim 14 and the hub plate 11 may optionally be made from different materials. Utilizing different materials for the steering wheel armature 10 provides greater flexibility in designing a steering wheel armature 10, for example the weight, tensile strength, hardness of the steering wheel rim 14 may be adjusted independently of the steering wheel hub plate 11. In addition, the present invention provides the customer with the opportunity to select a particular size and color rim 14 for the vehicle as oppose to the vehicle having a standard rim 14. Still another aspect of the present invention is the ability to cheaply correct a rotational vibration problem with a steering wheel assembly that has been installed into a vehicle by only replacing the rim 14. By adding mass to the steering wheel rim 14, the rotational vibration is diminished. In contrast, to combat this problem in a conventional steering wheel assembly, the entire armature 10 needs to be replaced which is not simple due to the complicated nature of a conventional steering wheel assembly, which has numerous components, namely a horn switch, an airbag module, and optionally electronic switches.

Figure 3:
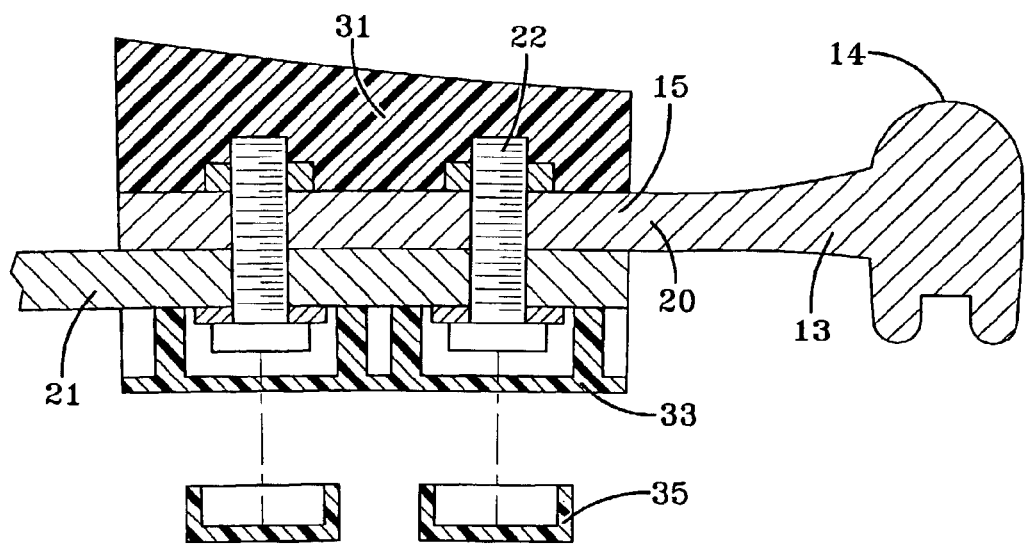
FIG. 3 shows a cross section of a spoke joint.

In accordance with the present invention, the steering wheel rim 14 is attached to the hub plate 11 via a spoke joint 15. A cross section of the spoke joint 15 is shown in FIG. 3, and the spoke joint 15 consists of a first plate 20 and a second plate 21 and a fastening means. In all of the FIGS., the fastening means is in the form of a bolt 22 and nut 23, but it is contemplated that the fastening means may be a screw or any other fastener that can be utilized to removably attach the first plate 20 to the second plate 21.

Figure 4:
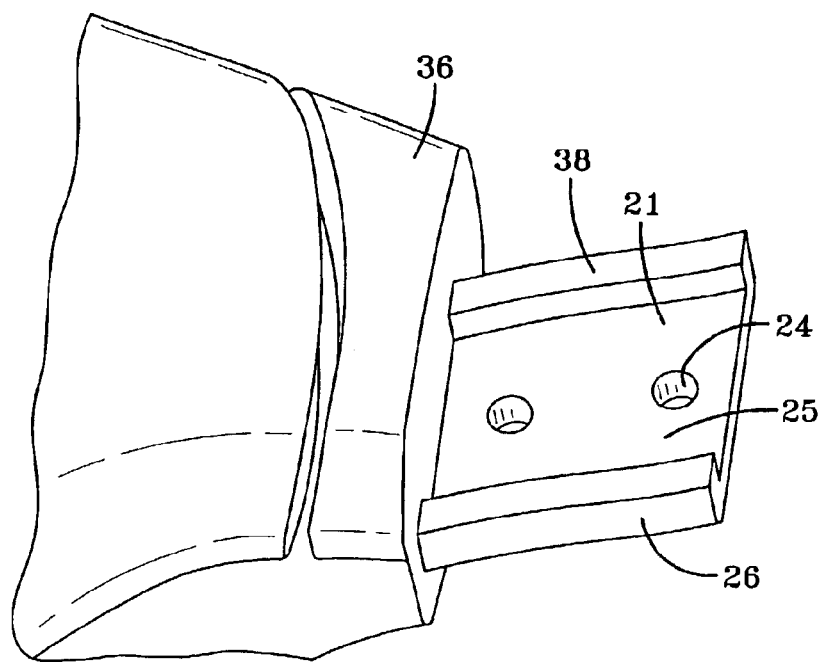
FIG. 4 shows a partial perspective view of an over molded hub plate with a second plate.

FIG. 4 shows a partial perspective view of the inner spoke 12 and the over molded hub plate 36. The steering wheel armature has a second plate 21 extending away from the center of the hub plate 11. The second plate 21 has two apertures 24 therethrough; the location and quantity of apertures may vary without departing from the scope of the present invention. As seen in FIG. 4, the second plate 21 has three free edges, two of which are raised. The edge that is not raised is the edge furthest away from the hub plate 11. The raised edges 26 have a flat top surface 38, and the raised edges 26 and the hub plate 11 define a recess 25 for receiving the first plate 20. Excluding the raised edges 26, the second plate 21 has a uniform thickness. The second plate 21 extends from the end of the inner spoke 12, or alternatively if the steering wheel does not have an inner spoke 12, the second plate 21 extends from the hub plate 11. The lack on an inner spoke 12 or a poorly defined inner spoke 12 on a steering wheel armature 10 will not interfere with the operation of removing or attaching the rim 14 to the steering wheel armature. Also, the number of second plates 21 on a steering wheel armature will correspond to the number of inner spokes 12.

Figure 5:
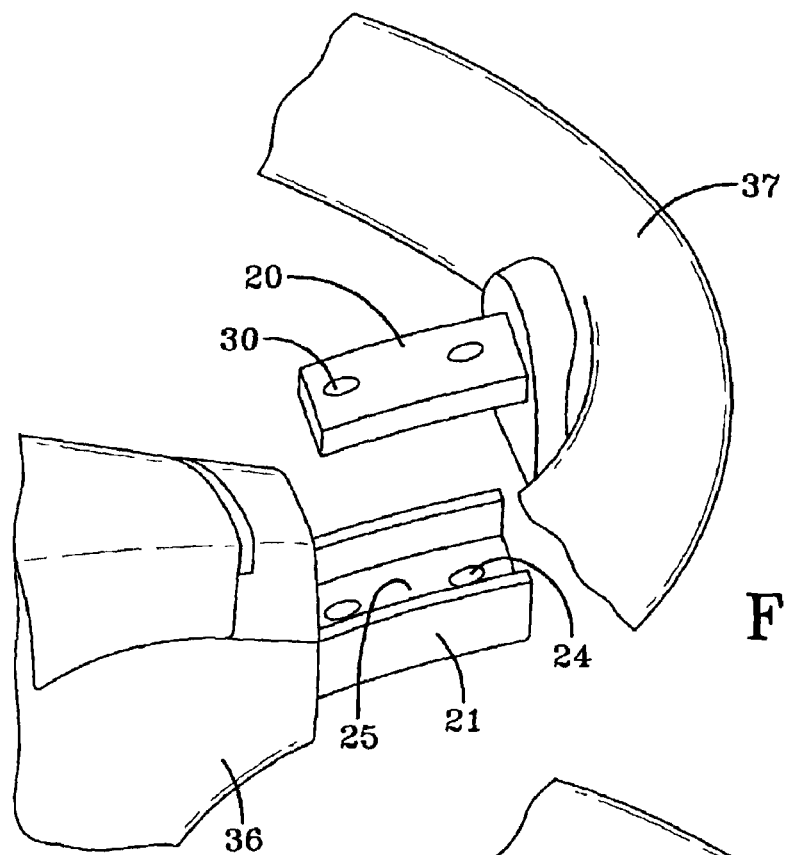
FIG. 5 depicts the first plate of the rim aligned with the second plate of the hub plate.
Figure 6:
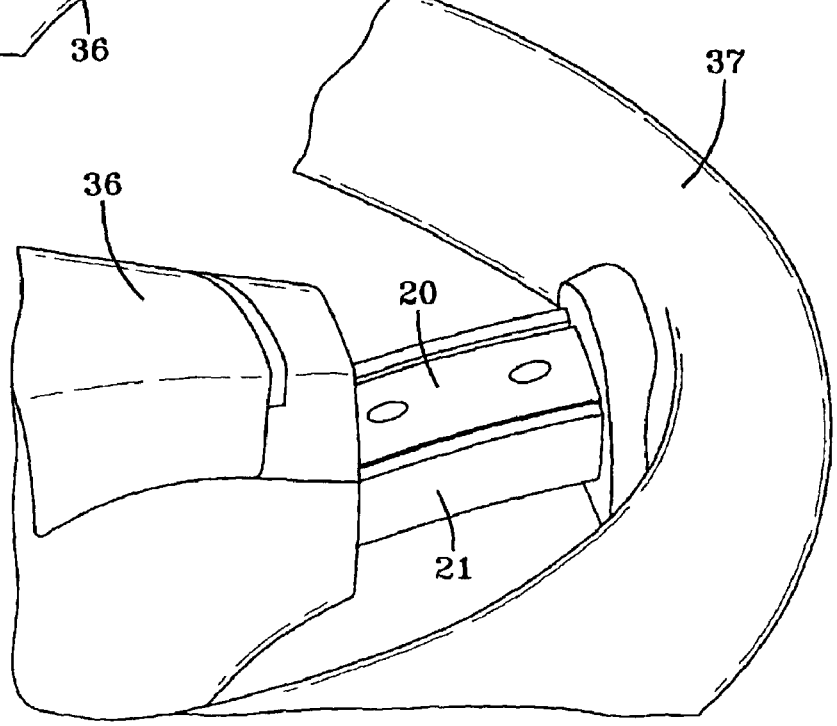
FIG. 6 shows an unsecured assembled view of the over molded rim and the over molded hub plate.

A portion of an over molded rim 37 with a first plate 20 is displayed in FIG. 5. The first plate 20 extends from the inner region of the steering wheel rim 14, or alternatively from the free end of the outer spoke 13 if the steering wheel has an outer spoke 13. A steering wheel having no outer spokes 13 or poorly defined outer spokes 13 will not interfere with the operation of removing or attaching the rim 14 to the steering wheel armature. The first plate 20 has an equivalent number of apertures 30 as the second plate 21. The first plate 20 as seen in FIG. 5 has two apertures 30, which are aligned with the apertures 24 of the second plate 21. The number and location of the apertures of the first plate 20 may vary without departing from the scope of the present invention as long as the apertures from the first plate 20 align with the apertures 24 from the second plate 21. Moreover, the number of first plates 20 will correspond to the number of second plates 21, and the quantity of first plates is equivalent to the quantity of outer spokes 13. The first plate 20 is joined with the second plate 21 in FIG. 6. The first plate 20 fits in the recess of the second plate 21 whereby the thickness of the first plate 20 is substantially the same as the thickness of the recess 25.

Figure 7:
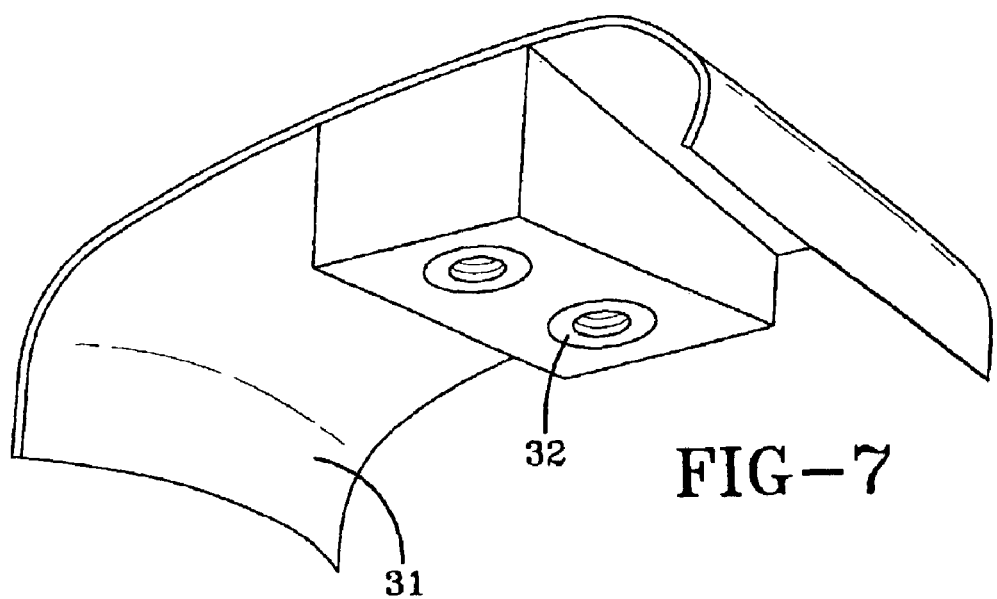
FIG. 7 shows a perspective view of a first cover.
Figure 8:
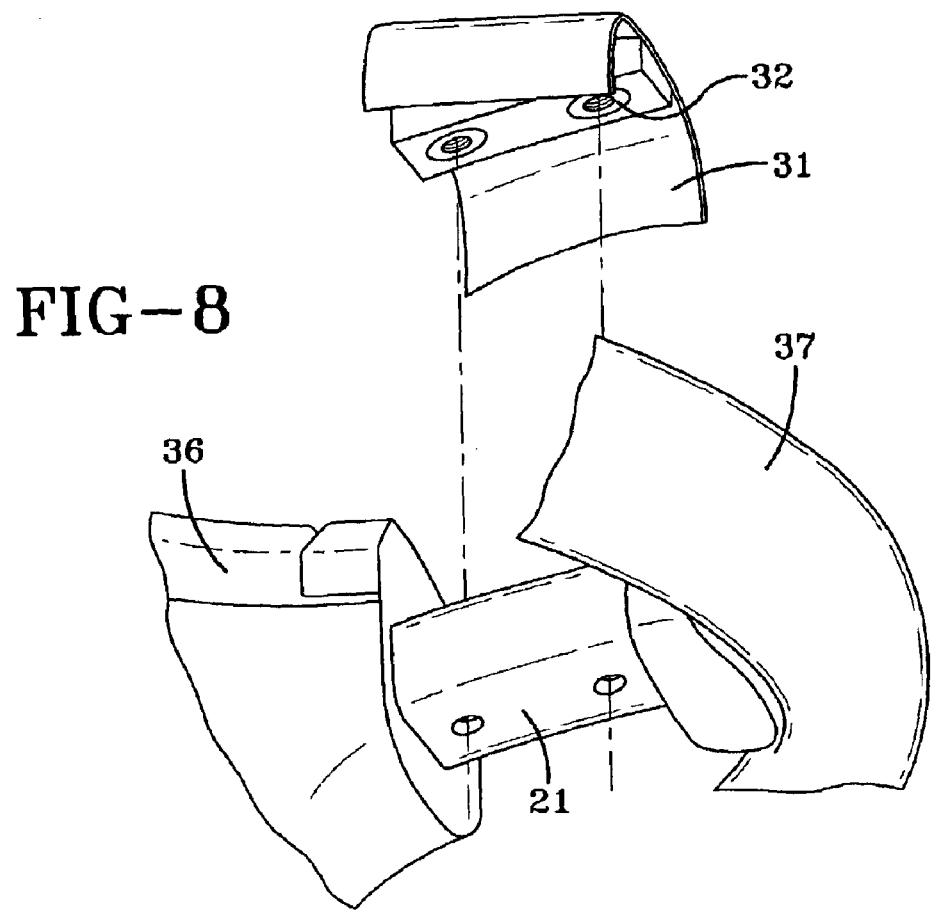
FIG. 8 depicts the nuts of the first cover aligned with the apertures of the first and second plates.

With reference to FIG. 7, the top cover 31 has two nuts 32 integrated therewith, and the top cover 31 is adapted to fit over the first plate 20 and a portion of the raised edges 26 of the second plate 21. The top cover 31 is made from a plastic material and the color of the top cover 31 may or may not match the color of the rim 14 and the hub plate 11. The preferred top cover 31 has nuts 32 integrated therewith, however, the top cover 31 may not be co-molded with nuts. The nuts may optionally be tightened to a bolt 22 followed by the attachment of the top cover 31 to the first plate 20. FIG. 8 shows nuts 32 of the top cover 31 aligned with the first and second plate apertures 30, 24.

Figure 9:
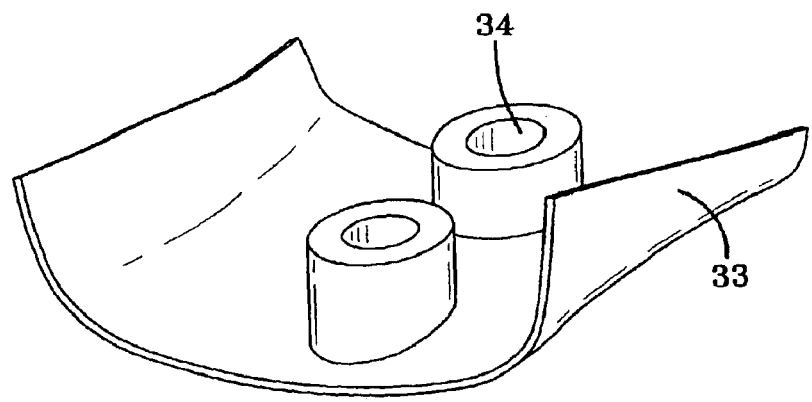
FIG. 9 shows a perspective view of a second cover.
Figure 10:
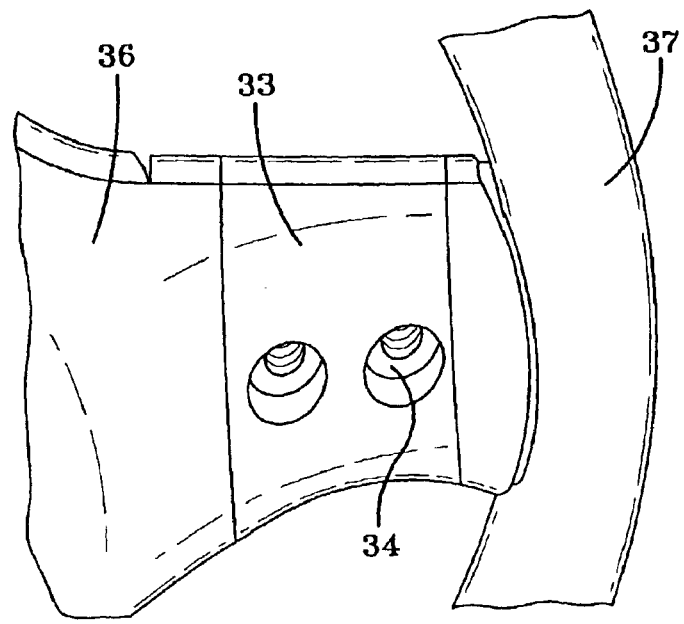
FIG. 10 shows a partial perspective view of a steering wheel assembly having a second cover.
Figure 11:
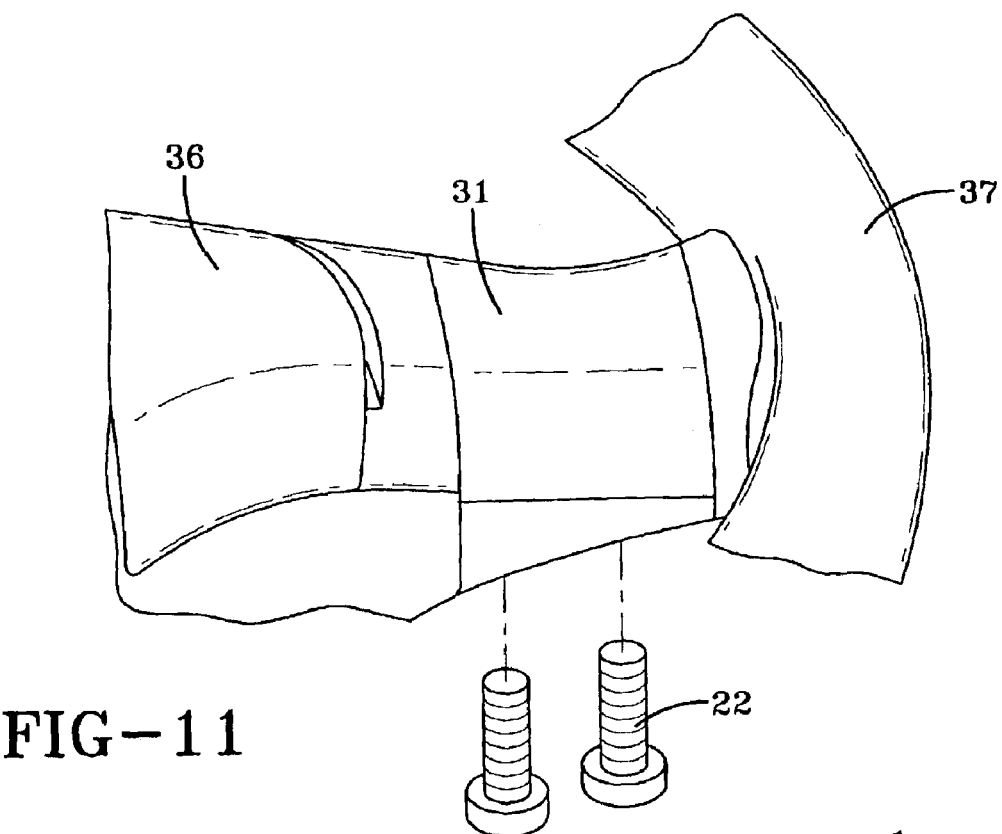
FIG. 11 shows a partial perspective view of a steering wheel assembly with two bolts.
Figure 12:
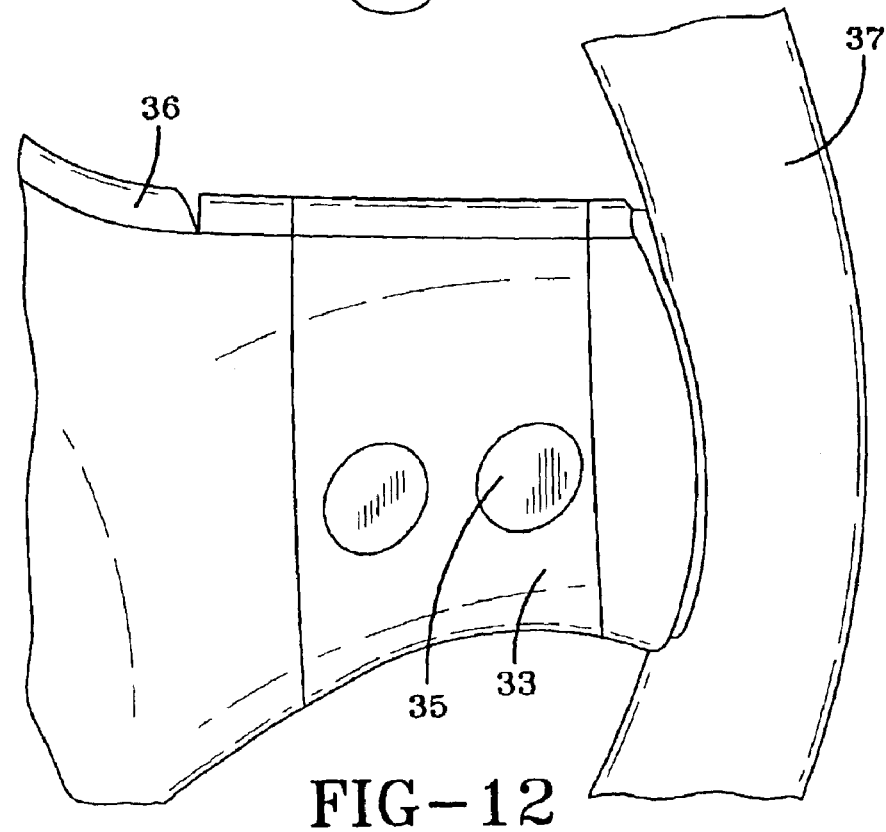
FIG. 12 a partial perspective view of a steering wheel assembly with insert plugs.

The bottom cover 33 is shown in FIG. 9 and is adapted to fit over the second plate 21. The bottom cover 33 is made from a plastic material, and after the bottom cover 33 and the top cover 31 are attached to the steering wheel, the first plate 20 and the second plate 21 are substantially enclosed or covered. The bottom cover 33 has two circular channels 34 integrated therewith for receiving a bolt 22 in each channel. In FIG. 10, the bottom cover 33 is disposed adjacent to the second plate 21 whereby the circular channels 34 are aligned with the second plate apertures 24 and the first plate apertures 30. FIG. 11 shows the bolts 22, which serve as the fastening means for the present invention. The bolts 22 are tightened into the nuts 32 which are integrated into the top cover 31; accordingly, the bolts 22 secure the bottom cover 33, the second plate 21, the first plate 20, and the top cover 31 together. FIG. 12 shows a bottom view of the spoke joint in which insert plugs 35 are inserted below the bolts 22 in order to conceal the bolts 22 and create a smooth surface for the bottom cover 33. The spoke joint in the present invention is essentially completely covered by the top cover 31 and the bottom cover 33; however the top cover 31 and the bottom cover 33 can easily be removed to allow the steering wheel rim 14 to be detached from the hub plate 11.

It will be clearly be understood by those skilled in the art that the foregoing description is made in terms of the preferred embodiment and various changes may be made without departing the scope of the present invention which is to be defined by the appended claims.

We claim:

1. A steering wheel assembly comprising:
   a rim having a substantially circular shape with a plurality of first plates extending from an interior region of the rim, the first plate having at least one aperture therethrough;
   a hub plate fixedly attached to a steering shaft and having a plurality of second plates radiating therefrom, wherein the number of second plates correspond in number to first plates, the second plate having at least one aperture therethrough, the second plate having two raised edges defining a recess with a depth for receiving the first plate and first plate having a thickness that is substantially equivalent to the depth of the recess; and
   a fastening means for attaching the first plate to the second plate, wherein the at least one aperture through the first plate is aligned with the at least one aperture through the second plate.

2. The steering wheel assembly according to claim 1 further comprising outer spokes extending from the rim, wherein the first plate extends from a free end of the outer spokes.

3. The steering wheel assembly according to claim 1 further comprising inner spokes extending from the hub plate, wherein the second plate extends from a free end of the inner spokes.

4. The steering wheel assembly according to claim 1 wherein the first plate has two apertures and the second plate has two apertures, wherein the first plate apertures are aligned with the second plate apertures.

5. The steering wheel assembly according to claim 1 further comprising a first cover adapted to fit over the first plate and a second cover adapted to fit over the second plate, wherein the first plate and the second plate are essentially covered by the first cover and the second cover.

6. A steering wheel assembly comprising:

a rim having a substantially circular shape;

a hub plate fixedly attached to a steering shaft and attached to the rim via a spoke joint; and the spoke joint comprises a first plate extending from the rim and a second plate extending from the hub plate, the second plate having at least one aperture therethrough and the first plate having at least one aperture therethrough whereby the at least one aperture through the second plate aligns with the at least one aperture through the first plate and the width of the second plate is substantially the same as the width of the first plate, the second plate having two raised edges defining a recess with a depth for receiving the first plate and first plate having a thickness that is substantially equivalent to the depth of the recess, wherein the rim is removably fastened to the hub plate so that the rim may be removed after the steering wheel assembly has been installed in a vehicle.

7. The steering wheel assembly according to claim 6 further comprising outer spokes extending from the rim, wherein the first plate extends from a free end of the outer spokes.

8. The steering wheel assembly according to claim 6 further comprising inner spokes extending from the hub plate, wherein the second plate extends from a free end of the inner spokes.

9. The steering wheel assembly according to claim 6 wherein the first plate has two apertures and the second plate has two apertures, wherein the first plate apertures are aligned with the second plate apertures.

10. The steering wheel assembly according to claim 6 further comprising a first cover adapted to fit over the first plate and a second cover adapted to fit over the second plate.

11. The steering wheel assembly according to claim 6 wherein the first plate is fastened to the second plate via a bolt and a nut.

12. A steering wheel assembly comprising:

a rim having a substantially circular shape;

a hub plate fixedly attached to a steering shaft and attached to the rim via a spoke joint; and the spoke joint comprises a first plate extending from the rim and a second plate extending from the hub plate, the second plate having at least one aperture therethrough and the first plate having at least one aperture therethrough whereby the at least one aperture through the second plate aligns with the at least one aperture through the first plate and the width of the second plate is substantially the same as the width of the first plate, the first plate being fastened to the second plate via a bolt and a nut;

a first cover adapted to fit over the first plate and a second cover adapted to fit over the second plate wherein the nut is molded into the first cover and the second cover has a circular channel for receiving the bolt, wherein the spoke joint is essentially covered by the first cover and the second cover, the rim being removably fastened to the hub plate so that the rim may be removed after the steering wheel assembly has been installed in a vehicle.

13. The steering wheel assembly according to claim 12 further comprising outer spokes extending from the rim, wherein the first plate extends from a free end of the outer spokes.

14. The steering wheel assembly according to claim 12 further comprising inner spokes extending from the hub plate, wherein the second plate extends from a free end of the inner spokes.

15. The steering wheel assembly according to claim 12 wherein the first plate has two apertures and the second plate has two apertures, wherein the first plate apertures are aligned with the second plate apertures.

16. The steering wheel assembly according to claim 12 wherein the second plate has two raised edges defining a recess with a depth for receiving the first plate and first plate has a thickness that is substantially equivalent to the depth of the recess.

* * * * *